2,747,416
DRIVE FOR TRACTOR TRANSMISSION AND POWER TAKE-OFF

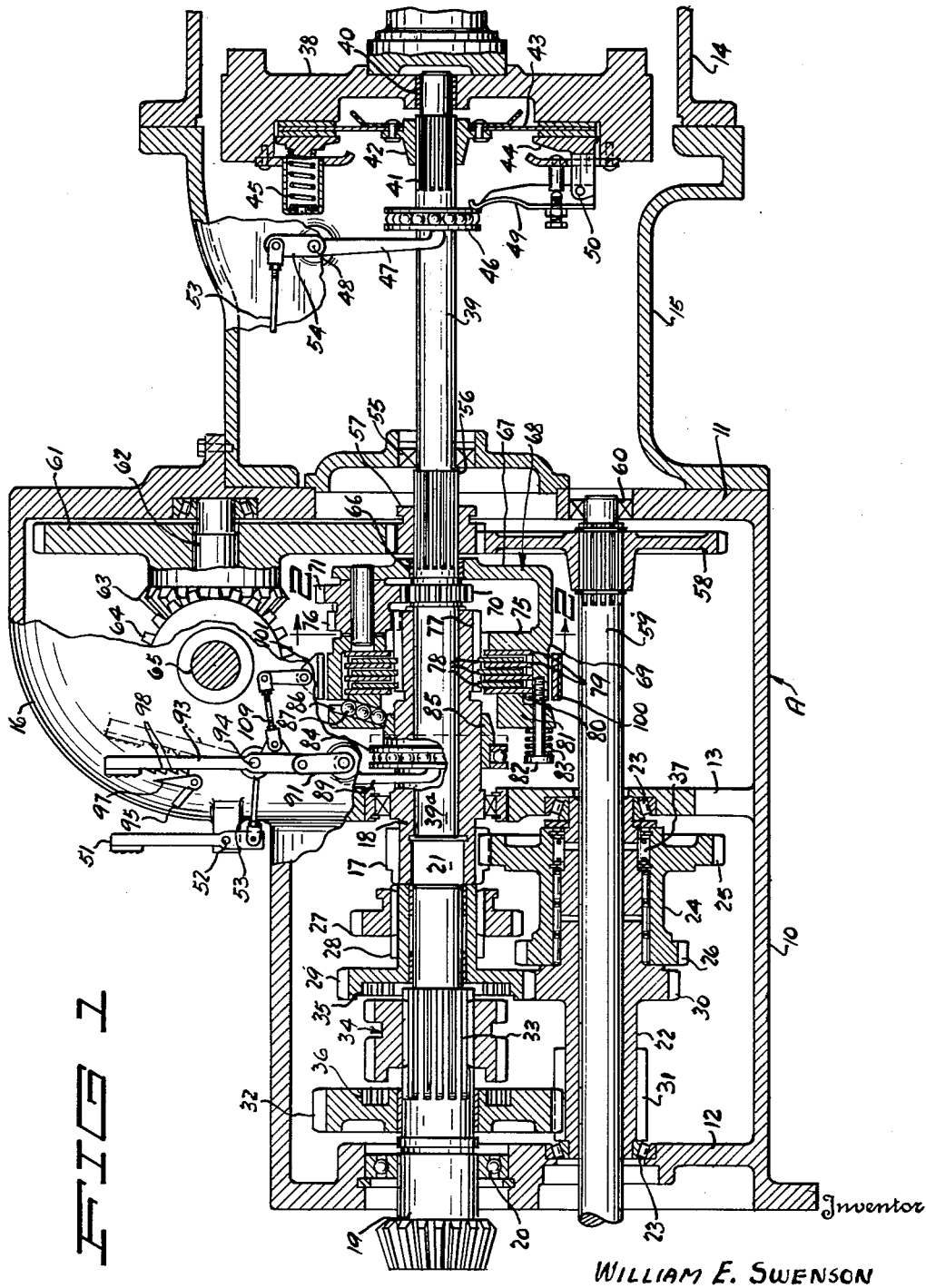

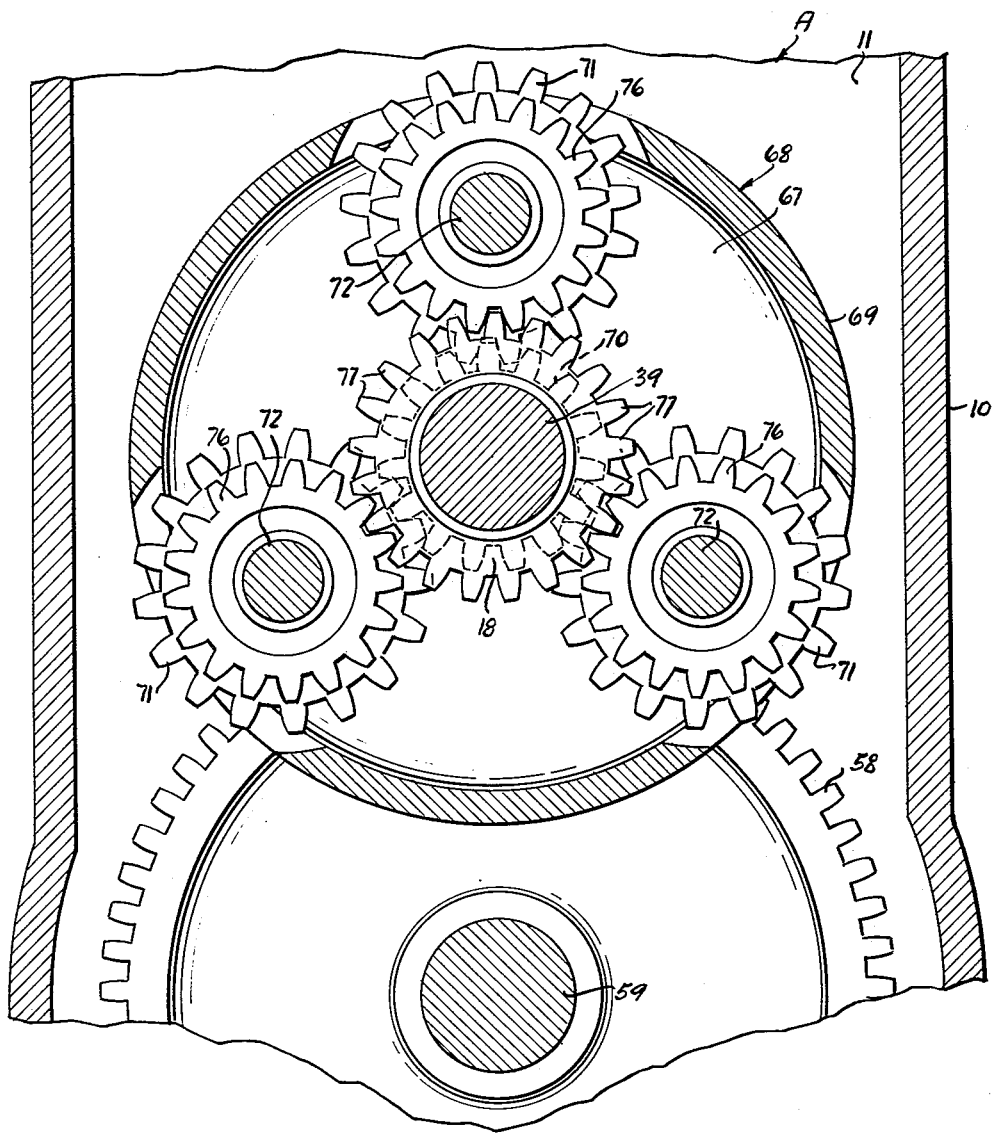

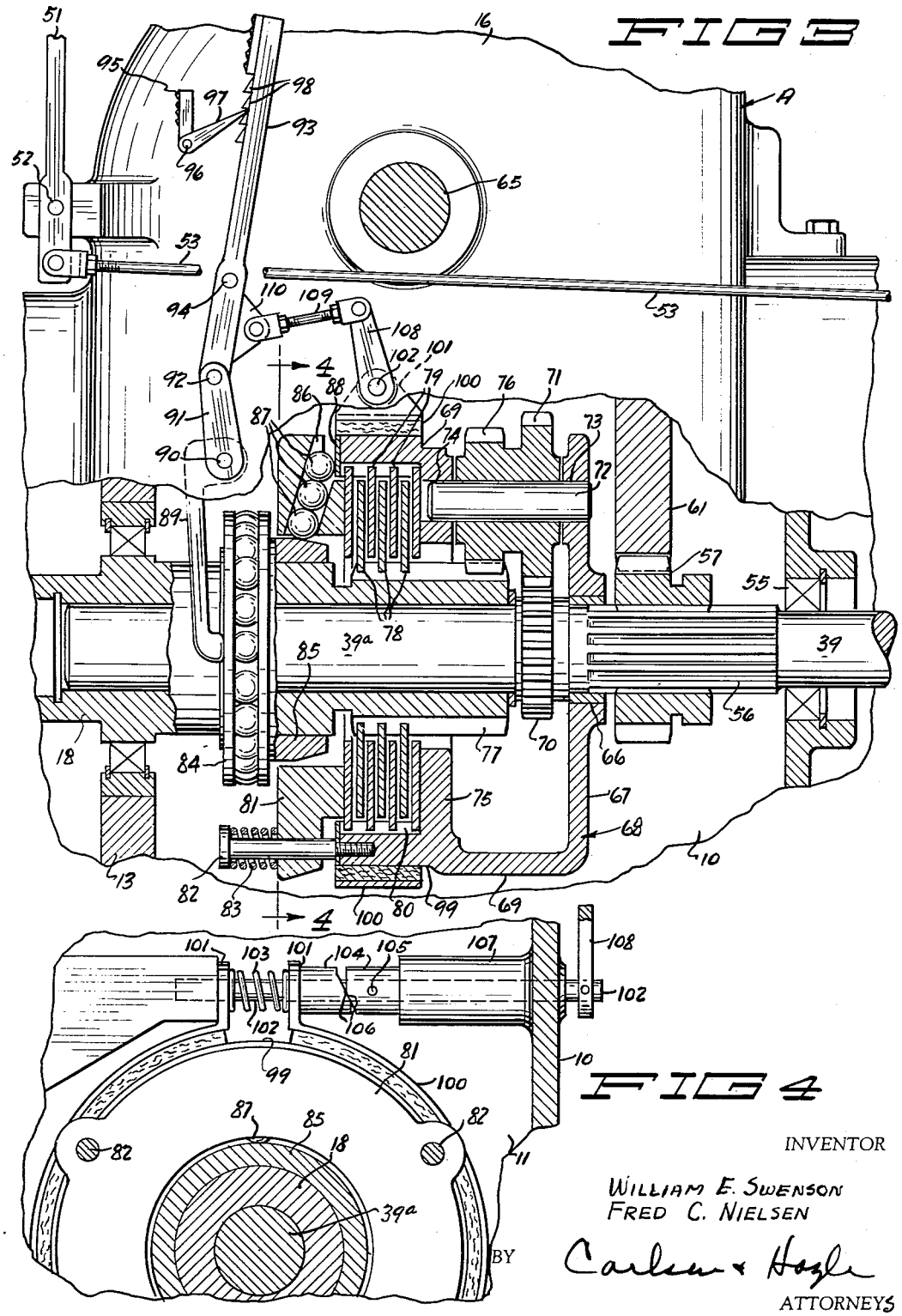

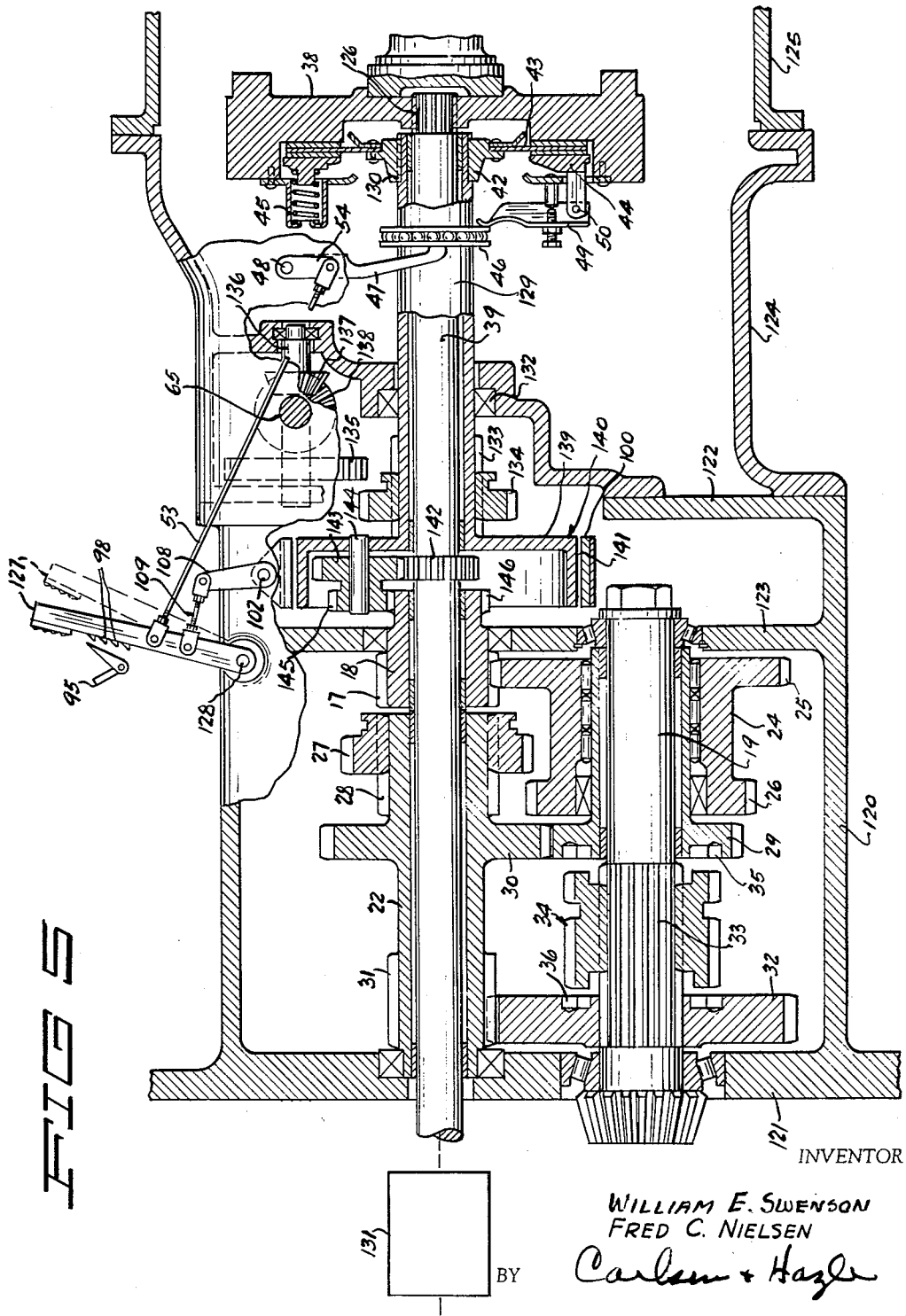

William E. Swenson and Fred C. Nielsen, St. Paul, Minn., assignors to Minneapolis-Moline Company, Hopkins, Minn., a corporation of Minnesota Application October 16, 1950, Serial No. 190,272

11 Claims. (Cl. 74—15.84)

This invention relates generally to improvements in transmission constructions for tractors and has as its object the improvement of the drive connection to the change speed transmission gears and to the power take-off shaft of the tractor.

In the operation of the usual tractor and implement combination, wherein the working parts of the implement are driven from the power take-off shaft by the tractor engine, it is highly desirable that provision be made for so declutching the change speed gearing that the tractor may be brought to a halt or shifted from one speed to another in such manner that the power take-off shaft remains in a running condition. This is for the reason that unless the implement parts remain in operation they are apt to become slugged with grain in the case of a combine for example, when the tractor is brought to a halt or declutched when making a speed change, as will readily be appreciated. It is also highly desirable that a tractor transmission have a wide range of forward speeds in order to meet all of the varying work conditions which are encountered and it is to this end that the Swenson prior copending application for Transmission, Serial No. 179,999 filed August 17, 1950, now Patent No. 2,660,900, is directed. However it is often necessary to change from one speed to another repeatedly in certain farm operations and for this purpose our present invention has as an important object the provision of a two-speed input drive to the transmission, under the control of a foot pedal, by the actuation of which the tractor may be shifted to and between two speeds quickly and safely, without torque interruption or operation of the usual gear shift lever and clutch pedal. In addition to this selective two-speed drive to the transmission the construction according to our invention effectively doubles the possible number of output speeds from the transmission since the shift from high to low range may be made at any selected forward speed as determined by the adjustment of the change speed gears. In the transmission as described in Swenson's prior application he has provided for six forward speeds but by the application thereto of the present two-speed input drive to the transmission there is made possible a total of twelve different forward speeds, well adapted and calculated to meet all of the working conditions which may be reasonably expected.

It is accordingly the primary object of the present invention to provide a conveniently controllable two-speed input drive for a tractor transmission by means of which the tractor may be shifted from a higher to a lower speed or vice versa, independent of the adjustment of the transmission itself, and to provide a drive arrangement such that the power take-off shaft may remain in a running condition at a constant optimum speed during all change speed adjustments of the tractor drive, or even with the tractor itself at a standstill.

A further object of our invention is to provide transmission and power take-off drive mechanism which may be conveniently controlled by means of a manually operative device such as a foot pedal in order to free the operator's hands for other tasks, with said foot pedal provided with a conveniently operable toe latch by which it may be held in adjusted positions or released as may be required.

A further object of our invention is to provide a two-speed input drive for a transmission including a compact and simple planetary reduction gear in combination with a brake and clutch operatively arranged to cause the planetary drive to rotate in unison with the input shaft to the transmission or to bring the planetary train to a halt and drive the transmission through the reduction afforded by the properly sized planetary gears.

A further object of our invention is to provide as one modification a transmission construction and drive arrangement wherein the power take-off shaft runs straight back from the engine flywheel through the transmission itself and is permanently connected to that flywheel to be operated at all times that the engine itself is in operation. Necessary clutching and speed reduction to the ultimate output shaft at the rear of the tractor may then be provided by the provision of suitable mechanism connected to the straight through shaft and located at the rear of the tractor.

These and other more detailed and specific objects will be disclosed in the course of the following specification, reference being had to the accompanying drawings, in which—

Fig. 1 is a longitudinal and vertical section through a transmission and associated driving mechanism according to the present invention and with a portion of the transmission casing shown in elevation to illustrate parts exterior thereof. In this view the two-speed input drive for the transmission is shown in a condition at which the input gear of the transmission is rotated at engine speed.

Fig. 2 is an enlarged fragmentary vertical cross section through the planetary drive mechanism as taken substantially along the line 2—2 in Fig. 1.

Fig. 3 is an enlarged elevational and sectional view of the center portion of the structure as shown in Fig. 1 and in this case showing the two-speed input drive mechanism as adjusted to drive the input gear of the transmission at less than engine speed.

Fig. 4 is a fragmentary vertical cross sectional view along the line 4—4 in Fig. 3 and showing particularly the brake or clamp band by which the rotation of the planetary drive mechanism is controlled.

Fig. 5 is a view similar to Fig. 1 but showing a modification thereof amounting to an inversion of the transmission change speed gears and showing the straight through arrangement of the power take-off shaft and related modifications of the two speed drive for the transmission.

Referring now more particularly and by reference characters to the drawing, the structure as shown in Figs. 1 through 4 will first be described and is shown as comprising a housing structure, designated generally at A, which in accordance with present day practice forms a part of the main fore and aft chassis of the tractor. It is, of course, to be understood that the precise housing arrangement here shown may be varied without affecting the essence of the invention embodied in this application but for convenience the housing is shown as comprising a main transmission gear case 10 having a forward wall 11, a rear wall 12 and intermediate partition wall 13, the same being joined to the rear end of the tractor engine crank case 14 by a flanged hollow connector section 15. The forward end portion of the casing 10 has an upward extension 16 designed to accommodate drive means for the usual belt pulley with which tractors are conventionally provided and this extension 16 also is here shown as acting as a support for foot pedals controlling certain elements of the transmission as will presently appear.

Arranged in the space between the walls 12 and 13 of the case 10 are the change speed gears of a transmission essentially identical to that disclosed in Swenson's prior application and patent hereinbefore referred to. While attention is invited to that patent for a more complete disclosure of the operation of the transmission, the same may be briefly described herein as having an input gear 17 which is formed at the rear end of a tubular power input shaft 18 journaled through a suitable bearing at the upper part of the wall 13. An output shaft 19 is arranged coaxially with respect to the shaft 18 and is journaled through a bearing 20 in the rear wall 12, as well as piloted at 21 into a suitable bearing formed within the gear 17. Arranged beneath these co-axial driving and driven shafts is a hollow countershaft 22 journaled in suitable bearings 23 and the forward portion of this countershaft forms a support for a gear cluster 24 including a gear 25 which meshes constantly with the input gear 17.

The gear cluster 24 also includes a gear 26 and arranged for selective engagement therewith is a shiftable gear 27 splined at 28 upon the hub of a gear 29 journaled upon the forward end of the shaft 19. The gear 29 meshes constantly with a gear 30 upon the countershaft 22 and the latter also includes a gear 31 meshing constantly with a gear 32 also journaled upon the shaft 19. Splined at 33 upon the shaft 19 is a selector gear or shuttle 34 having gear teeth for selective clutching engagement with internal gear teeth 35 and 36 formed in the facing sides of gears 29—32. The gear 27 is adapted to be shifted forwardly and rearwardly upon the splines 28 from a neutral position to positions for engaging the gear 26 and for meshing with the rear end of the input gear 17. The gear 27 and the shuttle clutch or gear 34 are both selectively shiftable forwardly and rearwardly and by proper adjustment thereof the output shaft 19 may be driven at six different speeds with reference to the speed of the input gear 17. It is not believed necessary to further describe the operation of the transmission herein since the present invention has to do primarily with a change speed drive to the transmission and to related improvements in the drive for the tractor power take-off shaft. It may be noted, however, that the gear cluster 24 is connected to the countershaft 22 by an overrunning clutch of conventional design, indicated at 37, so that the gear cluster and countershaft may operate at different speeds as required for certain adjustments of the transmission.

The drive for the transmission and related parts is taken from a connection to the usual flywheel 38 of the tractor engine as arranged at the rear of the crank case 14 and through a rearwardly extending drive shaft designated at 39, the forward end of which is journaled at 40 into the center of the flywheel. Rearwardly of the journal 40 the shaft 39 is splined at 41 to accommodate the hub 42 of a clutch disc 43 normally drivingly engaged with the flywheel by means of a pressure ring 44. The disc 43 and ring 44 are resiliently urged into frictional contact by a plurality of circumferentially spaced clutch springs, one of which appears at 45 in Fig. 1. Declutching is provided for by an anti-friction collar 46 mounted upon the shaft 39 and engaged by a shifter fork 47 carried upon a transverse shaft 48. Forward motion of the fork 47, and resulting forward movement of the collar 46, causes the latter to swing clutch operating arms 49 and these, through their conventional connection 50 with the pressure ring 44, free the clutch so that the drive is disabled to the shaft 39. This construction is completely conventional and requires no further detailed description. For the operation of the shifter fork 47 I illustrate a conventional clutch pedal 51 pivoted at 52 on the upper extension 16 of the transmission case and connected by a link rod 53 to a lever 54 upon one end of the shaft 48, outside of the connector casing 15. For purposes of differentiation this clutch is hereinafter referred to as the engine clutch.

The shaft 39 extends through a suitable bearing 55 into the forward portion of the transmission case 10 and has its rear portion 39a journaled in the hollow forwardly extending driving or input shaft 18 for the transmission. Immediately within the case 10 the shaft 39 is splined at 56 to slidably accommodate a shiftable gear 57 which meshes with a gear 58 secured upon the forward end of a power take-off shaft 59. The latter is journaled at 60 in the forward end 11 of the case 10 and extends rearwardly through the hollow countershaft 22 of the transmission, and while we here for convenience refer to this shaft 59 as the power take-off shaft it actually is the drive shaft therefor, since the ultimate rearwardly extending and exposed shaft for connection to the implement rearwardly of the tractor is not here shown. It will, of course, be obvious that the gear 57 will be shifted along the splines 56 to disable this drive to the shaft 59 whenever desired and by any suitable mechanism (not shown). Gear 57 also meshes with an upper gear 61 upon a stub shaft 62 journaled in the upward case extension 16 and this gear 61 is formed integrally with a bevel gear 63 meshing with a similar gear 64 upon a transversely extending belt pulley shaft 65.

Journaled at 66 upon the shaft 39 is the closed forward end 67 of a planetary gear cage, indicated generally at 68, arranged in the forward portion of the transmission case 10 and formed with a rearwardly extending cylindrical wall 69 surrounding the forward end of the hollow transmission input shaft 18. Immediately to the rear of this closed forward end 67 of the cage a driving sun gear 70 is secured upon the shaft 39 and this gear meshes with a plurality of primary planet gears 71 which are journaled in circumferentially spaced relation about the axis of shaft 39 upon bearing pins 72 carried by the gear cage. The forward ends of these pins 72 are held at 73 at the forward end 67 of the cage while the rear ends are similarly arranged at 74 in openings provided for their accommodation in an inwardly turned flange 75 formed within the cylindrical body 69 of the cage, forward of the rear edge thereof. The planet gears 71 are formed integrally with secondary planet gears 76 which mesh with elongated gear teeth or splines 77 formed around the outer periphery of the forward end of input shaft 18.

The open rear end of the cage 68, rearwardly of the inturned flange 75, is occupied by a multiple disc clutch, alternate discs 78 of which are notched around their inner peripheries to engage the teeth 77 so that they must rotate with the input shaft 18. The intermediate discs 79 of this clutch are similarly notched around their outer edges for engagement with splines 80 formed internally on the cylindrical body 69 of the planetary cage so that they must rotate with the cage. Thus the discs 78 and 79 are permitted axial movement relative to one another and they are normally urged tightly together, into frictional driving relation, by means of a pressure ring 81 slidably mounted upon the rear end of the planetary cage upon studs 82 at circumferentially spaced points. Expansion coil springs, one of which appears at 83, are placed upon the studs 82 and yieldably urge the ring 42 in a forward direction to engage this clutch as will be clearly apparent.

Provision is made for disengaging the clutch by means of an anti-friction collar 84 movably mounted upon the shaft 18 and having a forwardly tapered hub portion 85 as best shown in Fig. 3. This hub 85 projects forwardly into the interior of the ring 81 and at circumferentially spaced points the latter has radially and forwardly extending and angled passages 86 which open immediately to the rear of the rearward edge of the planetary cage 68. Located in each of these passages 86 is a plurality of balls 87, the innermost of which rides upon the forwardly tapered surface of the hub 85 in such fashion that forward motion of that hub will thrust the balls outward and forward. Due to the angularity at which the outermost ball 87 then bears upon the rear edge of the planetary cage there results a rearward motion of the ring 81 such as to free the clutch discs 78 and 79, whereas opposite rearward motion of the hub 85 will allow the springs 83 to restore the clutch discs to frictional driving engagement, as will be understood. While it may not be necessary we here show the rear face of the planetary cage as provided with a wear ring 88 against which the outer balls 87 will ride.

The collar 84 and hub 85 are moved forward to disengage the clutch discs 78—79 by means of a shifter fork 89 carried upon a transverse shaft 90. This shaft 90 is, of course, suitably supported and journaled in the case 10 and exteriorly thereof is provided with an arm 91 which is pivotally connected at 92 to the lower end of a manually operative member such as a foot pedal 93 fulcrumed at 94 upon the side of the case. The linkage is thus such that forward motion of the foot pedal 93 will swing the fork 89 forward causing the lower end thereof to urge the collar and hub 85 in the necessary direction for releasing the clutch. Also mounted upon the side of the case 10 and more particularly upon the upward extending portion 16 thereof is a toe latch 95 arranged upon a pivot 96 and having a forwardly extending pawl 97 for engagement with any one of a number of ratchet teeth 98 formed upon the foot pedal 93. It will be readily understood that as the pedal 93 is pushed forward the pawl 97 will selectively engage the ratchet teeth 98 to prevent the return of the pedal and hold the latter in a number of selected positions but that the operator may, by touching the latch with his toe, readily release the pawl when it is desired to release the foot pedal and return it to starting position.

The outer peripheral surface of the planetary cage 68 is faced off on the rear portion thereof forming a cylindrical brake surface 99 with which cooperates a surrounding friction surfaced clamp or brake band 100. At an upper point the band 100 is parted and provided with apertured ears 101 which are mounted upon a transversely journaled actuating shaft 102. An expansion spring 103 is preferably arranged between the ears 101 in order to normally expand the clamp band 100 and free it from the brake surface 99 upon the planetary cage. The shaft 102 is provided with conventional cooperating cam collars 104, one of which is pinned at 105 to the shaft so that by movement of the shaft in one direction the angular cam surfaces 106 of the collars will contract the clamp band causing it to frictionally engage said brake surface. As shown in Fig. 4 the pinned collar 104 is braced against a bearing 107 formed within the case 10 while the other collar is braced against the adjacent ear 101 and it may here be noted that the cam surfaces 106 are so cut as to permit a lost motion operation upon the initial turning of the shaft 102 before the actual contraction of the band 100 occurs. The shaft 102 at one end is journaled out to the exterior of the case 10 and secured to this exposed end is an arm 108, the upper end of which is connected by an adjustable link 109 to a lug 110 upon the lower end of the control pedal 93. The link 109 obviously permits relative angular adjustment of the arm 108 and pedal 93 and this adjsutment, in combination with the aforesaid lost motion action of the cam collars 104, is for the purpose of delaying the actual application of the clamp band 100 to the planetary cage 68 until after the clutch discs 78—79 are disengaged by the initial movement of the pedal 93.

In the operation of the structure as thus far described it will, of course, be understood that the engine clutch 43—44 will be engaged and disengaged by the usual operation of the clutch pedal 51 when making change speed adjustments of the transmission by the conventional gear shift lever. At all times, however, the tractor operator has available a two range speed adjustment for any of the six forward speed provided by the transmission here shown, under the control solely of the foot pedal 93. Normally this pedal stands in the position shown in full lines in Fig. 1 and in such position the multiple disc clutch 78—79 is engaged while the clamp band 100 is disengaged from the brake surface 99 of the planetary gear cage 68. Under these conditions the entire planetary drive system or mechanism revovles as a unit with the shafts 39—18 driving the transmission input gear 17 at engine speed. But the operator, by pressing forward upon the control pedal 93, may cause the same to first disengage the multiple disc clutch 78—79 by the operation of the shifter fork 89, and then clamp the band 100 upon the planetary gear cage 68 to bring the rotation of the latter to a halt, so that the torque transmission from shaft 39 to input shaft 18 is necessarily directed through the sun gear 70 to the primary planet gear 71 and through the secondary planet gear 76 to the sun gear teeth 77 formed upon the forward end of the shaft 18. As here shown the relative diameters of the gears 70, 71, 76, and 77 are such that this torque transmission to shaft 18 takes place at a reduced speed and this forward movement of the control pedal 93 thus immediately reduces the forward speed of the tractor as will be readily appreciated. If prolonged operation of the tractor is needed in this reduced speed the toe latch 95 holds the foot pedal 93 in the required position, but the tractor speed may be quickly restored to the previous higher rate by releasing this toe latch so that the clamp band 100 is expanded by the spring 103 and the clutch discs 78 and 79 re-engaged also as will be readily understood. We do not, of course, limit ourselves to the precise arrangement of the planetary gear train and the individual gears may, of course, be so proportioned as to bring about a forward speed increase rather than a decrease upon operation of the foot pedal 93 if so desired. The convenience of this readily available shift from high to low speed at any speed to which the transmission itself may be adjusted is of great importance for tractor-implement operation where field conditions or varying crop densities may make it extremely desirable to repeatedly vary the forward speed of the tractor within small ranges.

In addition this foot pedal controlled planetary two-speed drive makes possible the shifting of speeds in the transmission without stopping the operation of the power take-off shaft 59 as is the case when the engine clutch 43—44 is operated. Thus when it is desired to stop the tractor or to de-clutch the transmission while changing speeds therewith, the operator may depress the foot pedal 93 only far enough to disengage the multiple disc clutch 78—79. As this is done the drive to the transmission input shaft 18 is disabled since the planetary gear cage 68 then merely revolves idly with the shaft 39 and there is a de-clutched dwell period. But since the gear 57 is located upon this shaft forward of the planetary mechanism the drive to the power take-off shaft 59 thus effectively by-passes said mechanism and remains in operative connection to the flywheel 38. This is the primary purpose of the lost motion in the cam collars 104, which permits the disengagement of the multiple disc clutch prior to the actual application of the clamp band 100 to halt the rotation of the planetary cage 68. Thus it will be seen that this structure enables the tractor operator to make all necessary change speed adjustments of the travel of the tractor without halting the operation of the power take-off shaft, or alternatively to stop both the tractor and the power take-off shaft by the operation of the usual clutch pedal 51. The flexibility of the control thus provided has numerous advantages readily appreciated by those skilled in the art and needing no further description herein.

Referring now to the structure as shown in Fig. 5, the same comprises a transmission gear case 120 again having a rear wall 121, forward wall 122 and intermediate partition wall 123, and connected by a connector casing 124 to the rear end of the crank case 125. The engine flywheel and engine clutch structure is identical to that shown in the previous construction in most respects and corresponding parts are referred to by the same reference characters. In this case, however, the shaft 39 leading rearward from the flywheel 38 is splined into the flywheel, as indicated at 126, to be driven at all times from the engine independently of the engine clutch. The clutch pedal is, in Fig. 5, indicated at 127 as pivoted at 128 to the upper part of the case 120 and connected by the link 53 to the arm 54 which operates the shifter fork 47 for engaging and disengaging the engine clutch. The engine clutch now, however, controls the transmission of torque to a tubular shaft 129 journaled about the shaft 39 and for this purpose the hub 42 is splined at 130 onto the forward end of this tubular shaft.

Again the change speed gears for the transmission are arranged in the case 120 between the walls 121—123 but as compared to the structure shown in Fig. 1 the gears are inverted in position. The input gear 17, is, however, journaled in the upper forward portion of this compartment of this case, being formed as a part of the hollow input shaft 18 projecting forward through the wall 123. The shaft 18 is journaled upon the shaft 39 which extends rearwardly through the case 120 straight through from the engine, and also rearwardly of the gear 17 the shaft 39 forms a rotary support for the hollow countershaft 22. Thus in this case the countershaft 22 and input shaft 18 are co-axial while the power output shaft 19 is journaled in the lower portion of the gear case and the gear cluster 24 is journaled about the output shaft 19 with the gear 25 in constant mesh with the input gear 17. The other gear 26 of the gear cluster 24 is selectively engaged with a shiftable gear 27 in this case slidably splined at 28 upon the countershaft 22. In actuality the gear cluster 24 is journaled upon the hub of gear 29 which meshes with gear 30 upon the countershaft 32 while the final countershaft gear 31 meshes with the output gear 32 loose upon the output shaft 19. The selector gear or shuttle 34 is splined at 33 upon the output shaft 19 for selective engagement with the teeth 35 and 36 in the adjacent faces of the gears 29—32. Thus it will be apparent that the operation of the transmission is essentially identical to that disclosed in Fig. 1, and more particularly in the Swenson prior application previously referred to, but that the inversion of certain parts permits the shaft 39 to run straight through and out to the rear of the tractor for connection to the power take-off shaft. Inasmuch as in this case the shaft 39 will rotate at all times that the tractor engine is in operation the necessary declutching to the ultimate output power take-off shaft, and any speed reduction necessary, may be accomplished by the provision of a suitable clutch and reduction gear at the rear of the tractor as illustrated diagrammatically at 131. Since operation of the clutch pedal 127 will now have no declutching effect on the power take-off drive shaft 39 we thus achieve our object of continuous independent drive to the power take-off as will be understood.

The hollow shaft 129 surrounding the shaft 39 and controlled by the engine clutch 43—44 is journaled rearwardly through a bearing 132 and extends to a point spaced forwardly from the forward end of the transmission input shaft 18. To the rear of the bearing 132 shaft 129 is splined at 133 to carry a shiftable gear 134 for selective meshing engagement with a gear 135 journaled in the upper part of the casing structure. A shaft 136 carries the gear 135 and also a beveled gear 137 meshing with a similar gear 138 upon the transversely extending and projecting belt pulley shaft 65, thus providing for selective torque transmission to the belt pulley.

At its rear end the hollow shaft 129 is formed integrally with, or suitably secured to, the forward end 139 of a planetary gear cage designated generally at 140, having a cylindrical wall 141. Within this wall the shaft 39 has affixed a driving sun gear 142 meshing with a primary planet gear 143 carried upon a suitably supported pin 144 in the gear cage. A secondary planetary gear 145 is connected to the gear 143 and meshes with gear teeth 146 formed around the forward end of the transmission input shaft 18. There will, of course, be a plurality of the primary and secondary planet gear units although only one set appears in Fig. 5. Surrounding the wall 141 of the planetary gear cage is a clamp band 100, identical in construction and arrangement to the band previously referred to, and adapted to be clamped in braking engagement with the planetary gear cage by means of a shaft 102 having an arm 108 connected by an adjustable link 109 to the clutch pedal 127. Here also lost motion is provided so that upon movement of the clutch pedal 127 the engine clutch will be disengaged prior to the application of the clamp band 100 to the planetary gear cage 140. In this case also since a single clutch pedal is provided it is formed with ratchet teeth 98 for engagement by the toe latch 95 exactly as previously described.

In the normal operation of the structure shown in Fig. 5 the engine clutch 43—44 is engaged and the clamp band 100 disengaged as shown and since the shafts 39—129 thus rotate in unison the entire planetary gear system is locked and rotates as a unit to drive the transmission input shaft 18 at engine speed. But to drop to a lower speed the operator now presses forward upon the clutch pedal 127 far enough to disengage the engine clutch and then apply the clamp band 100 to the planetary gear cage 140 and hold the latter against rotation. The shaft 129 is now stationary but the shaft 39 continues to rotate and torque is transmitted from the gear 132 to the planet gears 143—145 and to the gear teeth 146 upon the transmission input shaft 18 driving the latter at a reduced speed assuming, of course, that the planetary gears are dimensioned to bring about a speed reduction. Thus again the operator has at his command two different speed ranges for each change speed adjustment of the transmission itself exactly as previously described.

In making the normal change speed adjustments of the transmission the necessary declutching is brought about by an initial movement of the clutch pedal 127 to disengage the engine clutch but without applying the clamp band 100 to the planetary gear cage as will be readily understood.

In each of Figs. 1–5 the transmission made up of the series of change speed gear trains driven by the input gear 17 constitutes what may be referred to as a main change speed transmission unit, while the planetary two speed drive units, embodying the planet gears 71—76 and 143—145 respectively, function as second or auxiliary change speed transmission units, as will be readily apparent.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. For a tractor including a change speed transmission with an input drive shaft and co-axial engine operated shaft, a two speed drive connection for said shafts whereby the output speed of the transmission may be varied at any change speed adjustment thereof, comprising a rotatably supported planetary gear cage, a sun gear on each shaft, connected planet gears on the cage meshing with the respective sun gears, a clutch normally connecting the cage to rotate with one of said shafts whereby the planet and sun gears rotate in unison and transmit torque without speed change from the engine operated shaft to the input shaft, means for holding the cage against rotation when the cage is declutched in order then to transmit torque from the sun gear on the engine operated shaft through the planet gears to the sun gear on the input drive shaft at a speed determined by the relative sizes of the gears, means for controlling the clutch, a power take-off shaft, and a drive connection from the power take-off shaft to the engine operated shaft by-passing the said two-speed connection to rotate the take-off shaft independently of the described change speed adjustments.

2. In a tractor, mechanism for transmitting propulsion power from the engine and also torque from the engine to a power take-off shaft, comprising a main change speed transmission unit having power trains of different speed ratios changeable while the tractor is at rest, a clutch having a part driven by the engine when the clutch is engaged, a drive shaft operatively connected to the said clutch part, the main change speed transmission unit having an input shaft, a second change speed transmission unit connecting the drive shaft to the input shaft of the main transmission unit, and means associated with the second transmission unit for selectively controlling the same to cause high speed low torque output and alternatively a lower speed higher torque output to be transmitted while the tractor is in motion and at any speed adjustment of the main transmission unit, a power take-off shaft, and means by-passing said second change speed transmission unit and connecting the power take-off shaft to the engine.

3. In a tractor, mechanism for transmitting propulsion power from the engine and also torque from the engine to a power take-off shaft, comprising a main change speed transmission unit located rearwardly of the engine and having power trains of different speed ratios changeable while the tractor is at rest, a clutch having a part driven by the engine when the clutch is engaged, a drive shaft extending rearwardly from and operatively connected to the said clutch part for rotation by the engine when the clutch is engaged, the main change speed transmission unit having an input shaft coaxial with the drive shaft, a second change speed transmission unit located forwardly of the main transmission unit and connecting the drive shaft to the input shaft of the main transmission unit, means associated with the second transmission unit for selectively controlling the same to cause high speed low torque output and alternatively a lower speed higher torque output to be transmitted while the tractor is in motion, a longitudinally extending power take-off shaft extending at its forward end toward the engine beyond the said second transmission unit, and drive means connecting the forward end of the power take-off shaft to the engine and by-passing the said second transmission unit, said drive means including a part secured to the power take-off shaft and a part coaxial with the said drive shaft.

4. In a transmission assembly, the combination of a drive shaft, a first intermediate shaft, a clutch between said drive shaft and said first intermediate shaft, a second intermediate shaft, means for drivingly releasably interconnecting said two intermediate shafts, a countershaft, gearing interconnecting said countershaft and said second intermediate shaft, a power take-off mounted concentrically with said countershaft, and gearing continuously interconnecting said first intermediate shaft and said power take-off shaft, said clutch when engaged completing a drive at all times to said power take-off shaft and said releasable means when interconnecting said intermediate shafts being effective to complete a drive to said countershaft only during the engagement of said clutch.

5. Power transmitting mechanism for a tractor having an engine, a change speed transmission and a power take-off shaft for operating machinery traveling with the tractor, comprising in combination, means for driving the transmission from the engine at engine speed or selectively at a different speed, means for driving the power take-off shaft from the engine and including a clutch for disabling that drive, a control mechanism for the means driving the transmission, said control mechanism being adjustable to two conditions for selecting the speed at which the transmission is driven and having an intermediate dwell position at which the torque to the transmission is interrupted but the torque is unbroken to the power take-off shaft.

6. For a tractor including a change speed transmission with an input drive shaft and co-axial engine operated shaft, a two speed drive connection for said shafts whereby the output speed of the transmission may be varied at any change speed adjustment thereof, comprising a rotatably supported planetary gear cage, a sun gear on each shaft, connected planet gears on the cage meshing with the respective sun gears, a clutch normally connecting the cage to rotate with one of said shafts whereby the planet and sun gears rotate in unison and transmit torque without speed change from the engine operated shaft to the input shaft, a brake for locking the cage against rotation to transmit torque from the sun gear on the engine operated shaft through the planet gears to the sun gear on the input drive shaft at a speed determined by the relative sizes of the gears, means for operating the said clutch and brake and unlocking the planetary cage, a power take-off shaft, and a drive connection from the power take-off shaft to the engine operated shaft by-passing the said two-speed connection to rotate the take-off shaft independently of the described change speed adjustments.

7. In a tractor including a change speed transmission with an input drive shaft and co-axial engine operated shaft, a two-speed drive connection for said shafts whereby the output speed of the transmission may be varied at any change speed adjustment thereof, comprising a rotatably supported planetary gear cage, a sun gear on each shaft, connected planet gears on the cage meshing with the respective sun gears, a clutch normally connecting the cage to rotate with one of said shafts whereby the planet and sun gears rotate in unison and transmit torque without speed change from the engine operated shaft to the input shaft, a brake for locking the cage against rotation to transmit torque from the sun gear on the engine operated shaft through the planet gears to the sun gear on the input shaft at a different speed, means for operating the clutch and brake, and a power take-off shaft connection to the engine operated shaft independent of said clutch whereby the power take-off shaft may operate with the transmission declutched.

8. Power transmitting mechanism for a vehicle having a change speed transmission with a casing and an input shaft and a co-axial engine driven shaft, comprising in combination, a planetary gear cage journaled on one of the shafts, sun gears on the input and engine driven shafts, planet gears carried by the cage and meshing with the respective sun gears, a disc clutch in the cage operative to releasably lock the cage to the input shaft whereby the two shafts and cage will rotate as a unit, a clamp band surrounding the cage and operative to lock the cage to the casing as it is declutched from the input shaft to thereby transmit the torque through the sun and planet gears, a manually operative control device, and linkage connecting the control device to the clutch and clamp band for operating the same in sequence, said linkage including a lost motion connection whereby the first movement of the control device will declutch the cage and disable the drive to the input shaft for making change speed adjustments of the transmission.

9. Power transmitting mechanism for a vehicle having a change speed transmission with a casing and an input shaft and a co-axial engine driven shaft, comprising in combination, a planetary gear cage journaled on one shaft, sun gears on the input and engine driven shafts, planet gears carried by the cage and meshing with the respective sun gears, a disc clutch in the cage operative to releasably lock the cage to the input shaft whereby the two shafts and cage will rotate as a unit, a clamp band surrounding the cage and operative to lock the cage to the casing as it is declutched from the input shaft to thereby transmit the torque through the sun and planet gears, a manually operative control device, linkage connecting the control device to the clutch and clamp band for operating the same in sequence, said linkage including a lost motion connection whereby the first movement of the control device will declutch the cage and disable the drive to the input shaft, a power take-off shaft drive connection to the engine operated shaft, and an engine clutch for controlling the drive to the engine operated shaft and power take-off shaft simultaneously.

10. Power transmitting mechanism for a vehicle having a change speed transmission with a casing and an input shaft and a co-axial engine driven shaft, comprising in combination, a planetary gear cage journaled on the engine driven shaft, sun gears on the input and engine driven shafts, unitary planet gears carried by the cage and meshing with the respective sun gears, a disc clutch in the cage operative to releasably lock the cage to the input shaft whereby the two shafts and cage will rotate as a unit, a clamp band surrounding the cage and operative to lock the cage to the casing as it is declutched from the input shaft to thereby transmit the torque through the sun and planet gears, a foot pedal, linkage connecting the foot pedal to the clutch and clamp for operating the same in sequence, and a toe latch for holding the foot pedal in adjusted positions.

11. Power transmitting mechanism for a vehicle having a change speed transmission with a casing and input shaft, a co-axial engine driven shaft, and an engine clutch controlling torque transmission to the engine driven shaft, comprising in combination, a planetary gear cage journaled on one shaft, sun gears on the input and engine driven shafts, planet gears carried by the cage and meshing with the respective sun gears, a disc clutch in the cage operative to releasably lock the cage to the input shaft whereby the two shafts and cage will rotate as a unit, a clamp band surrounding the cage and operative to lock the cage to the casing as it is declutched from the input shaft to thereby transmit the uninterrupted torque through the sun and planet gears, a foot pedal, and linkage connecting the foot pedal to the clutch and clamp band for operating the same in sequence, said linkage including a lost motion connection whereby the first movement of the foot pedal will declutch the cage and disable the drive to the input shaft for making change speed adjustments of the transmission, and a power take-off shaft drive connection to the engine operated shaft.

References Cited in the file of this patent

UNITED STATES PATENTS

| | | |
|---|---|---|
| 763,548 | Ferguson | June 28, 1904 |
| 1,139,330 | Black | May 11, 1915 |
| 1,250,386 | Thiem | Dec. 18, 1917 |
| 1,274,056 | Denman-Jones | July 30, 1918 |
| 2,115,212 | Padgett | Apr. 26, 1938 |
| 2,168,033 | Johnston | Aug. 1, 1939 |
| 2,287,279 | Stumpf | June 23, 1942 |
| 2,349,880 | Orelind | May 30, 1944 |
| 2,439,079 | Davidson | Apr. 6, 1948 |
| 2,513,333 | Keese | July 4, 1950 |
| 2,564,466 | Clifton | Aug. 14, 1951 |